(12) United States Patent
Anyaogu et al.

(10) Patent No.: US 11,649,330 B2
(45) Date of Patent: *May 16, 2023

(54) ADHESIVE TREATMENT FOR FIBER FOR POLYMER REINFORCEMENT AND REINFORCED PRODUCTS

(71) Applicant: GATES CORPORATION, Denver, CO (US)

(72) Inventors: Kelechi C. Anyaogu, Sterling Heights, MI (US); John Graeme Knox, Oxford, MI (US)

(73) Assignee: Gates Corporation, Denver, CO (US)

( * ) Notice: Subject to any disclaimer, the term of this patent is extended or adjusted under 35 U.S.C. 154(b) by 343 days.

This patent is subject to a terminal disclaimer.

(21) Appl. No.: 16/867,478

(22) Filed: May 5, 2020

(65) Prior Publication Data
US 2020/0262988 A1 Aug. 20, 2020

Related U.S. Application Data

(62) Division of application No. 15/348,712, filed on Nov. 10, 2016, now Pat. No. 10,640,619.

(51) Int. Cl.
*C08J 5/06* (2006.01)
*F16G 1/10* (2006.01)
(Continued)

(52) U.S. Cl.
CPC ............... *C08J 5/06* (2013.01); *C08J 5/042* (2013.01); *C08J 5/046* (2013.01); *C09J 109/00* (2013.01);
(Continued)

(58) Field of Classification Search
CPC ..... C08J 5/06; C08J 5/042; C08J 5/046; C08J 2309/00; C08J 2315/00; C08J 2323/16;
(Continued)

(56) References Cited

U.S. PATENT DOCUMENTS 5,565,507 A * 10/1996 Marco ............... C09J 163/00
523/411
10,640,619 B2 * 5/2020 Anyaogu ............... F16G 1/28
(Continued)

OTHER PUBLICATIONS

Hans-Wilhelm Engles et al., "Rubber 9. Chemicals and Additives," Ullmann's Encyclopedia of Industrial Chemistry, published online 2011, 66 pages. (Year: 2011).*

*Primary Examiner* — Angela C Scott
(74) *Attorney, Agent, or Firm* — Kevin J. Aiken, Esq.

(57) ABSTRACT

An aqueous adhesive composition for treating a reinforcing fiber for bonding to a thermosetting polymer matrix and products made therefrom such as power transmission belts. The adhesive composition includes: water as the solvent or dispersing medium; a polyelectrolyte co-curable with the polymer matrix; a primer material compatible with the fiber and co-curable with the polyelectrolyte; and optionally a rubber curative compatible with the polyelectrolyte and the polymer matrix. A fiber-reinforced, composite polymer system may thus include a thermosetting polymer matrix, a reinforcing fiber embedded therein, and an adhesive composition coating the fiber; the adhesive composition including a polyelectrolyte co-curable with the polymer matrix and a primer material compatible with the fiber and co-curable with the polyelectrolyte. The adhesive composition may include a curative compatible with the polyelectrolyte. In one preferred embodiment, the invention is an aqueous adhesive composition including water, an epoxy resin, a maleated polybutadiene derivative, and a curative.

23 Claims, 3 Drawing Sheets (51) Int. Cl.
*C09J 113/00* (2006.01)
*F16G 1/28* (2006.01)
*F16G 5/08* (2006.01)
*C08J 5/04* (2006.01)
*C09J 109/00* (2006.01)

(52) U.S. Cl.
CPC ............... *C09J 113/00* (2013.01); *F16G 1/10* (2013.01); *F16G 1/28* (2013.01); *F16G 5/08* (2013.01); *C08J 2309/00* (2013.01); *C08J 2315/00* (2013.01); *C08J 2323/16* (2013.01); *C08J 2409/00* (2013.01)

(58) Field of Classification Search
CPC ........ C08J 2409/00; F16G 1/10; F16G 1/128; F16G 1/28; F16G 5/08; C09J 109/00; C09J 113/00; C09J 111/00; C09J 163/00; C08K 5/14; C08K 9/08
See application file for complete search history.

(56) References Cited

U.S. PATENT DOCUMENTS

| | | | | |
|---|---|---|---|---|
| 2002/0144779 | A1* | 10/2002 | Pelton | C09J 5/06 156/334 |
| 2003/0152758 | A1* | 8/2003 | Huynh-Tran | C08J 5/06 524/114 |

* cited by examiner

ADHESIVE TREATMENT FOR FIBER FOR POLYMER REINFORCEMENT AND REINFORCED PRODUCTS

BACKGROUND OF THE INVENTION

This invention relates generally to an adhesive treatment for fibers or a tensile cord for reinforcement of polymeric or elastomeric products such as power transmission belts and hose, more particularly to an aqueous adhesive treatment for fibers such as carbon fiber, which include a primer material such as an epoxy, a polyelectrolyte material such as a maleated polybutadiene derivative, and a curative such as an organic peroxide or a sulfur-based curative.

The most common fiber bonding system in the reinforced rubber product arts is based on primed fiber treated with resorcinol-formaldehyde-latex ("RFL") adhesive. U.S. Pat. No. 6,857,159 B2, the contents of which are hereby incorporated herein by reference, is an example disclosing the use of RFL on carbon fiber tensile cords for rubber belts. Many variations for the RFL adhesive have been proposed.

Various supplemental adhesion promoters have been proposed to enhance the usefulness of the RFL. One example is EP 1,451,244 B1 which discloses a primer consisting of a ring-opened, maleinized polybutadiene and a phenolic derivative. Also proposed is that the primer may be used as an additive to the RFL to reduce the number of dipping stages. Other adhesion promoters have been added to RFL.

Another example of a variation of the RFL is removal of the RF resin component and substitution of an alternate material to promote adhesion or provide other properties. U.S. Pat. No. 7,256,235 B2 discloses an adhesive composition comprising a latex of a hydrogenated styrene-butadiene rubber, a carboxylated hydrogenated styrene-butadiene rubber, a hydrogenated nitrile-butadiene rubber, a carboxylated hydrogenated nitrile-butadiene rubber, a chlorosulfonated polyethylene or blends thereof; plus an aqueous solution of a half-ester of maleinized liquid poly butadiene; and, optionally, up to about 15% by weight carbon black in an aqueous solution. Examples on isocyanate-pretreated polyester cord are disclosed.

U.S. Pat. No. 7,067,189 B2 discloses an adhesion promoter comprising a polymeric strand with an epoxy-reactive group other than a phenolic hydroxyl group, and a cross-linking group that crosslinks the polymeric strand with a rubber in a crosslinking reaction. The adhesion promoter combined with a styrene-butadiene-vinylpyridine latex increases adhesion of rubber to polymeric fibers. The adhesion promoter may also be added to the rubber. Examples disclosed are based on epoxy-finished polyester cords in SBR and BR rubber compounds.

In the power transmission belt art, while achieving excellent cord-to-rubber adhesion is needed for enhanced belt life, it is equally important for the cord to exhibit good flex-fatigue to maintain performance particularly in belt applications where severe belt bending occurs throughout the service life. Realizing the right balance of excellent cord adhesion and belt flex-fatigue has been a fundamental challenge in many belt designs, in part because most of the conventional adhesive systems (such as RFL) become relatively rigid within the cord bundle and at the cord-rubber body interface after vulcanization. As a result, when such belt is subjected to repeat flexing or back bends the adhesive layer becomes more brittle and delaminates leading to belt failures. Failure modes may include cord tensile failure, adhesive delamination, edge-cord pull, etc. Therefore, an adhesive system that can provide both excellent cord adhesion and flex-fatigue would be desirable, especially for use with high-modulus, high-stiffness, tensile members such as carbon-fiber cords.

SUMMARY

The present invention is directed to composite material compositions and systems and methods which provide adhesion and flexibility for fiber reinforcements in polymer composites, or provides adhesion and flexibility for carbon fiber tensile cords in power transmission belts.

An aqueous adhesive composition for treating a reinforcing fiber for bonding to a thermosetting polymeric matrix and products made therefrom such as power transmission belts and hose. The adhesive composition includes: water as the solvent or dispersing medium; a polyelectrolyte co-curable with the polymer matrix; a primer material compatible with the fiber and co-curable with the polyelectrolyte; and optionally a rubber curative compatible with the polyelectrolyte and the polymer matrix. A fiber-reinforced, composite polymer system may thus include a thermosetting polymer matrix, a reinforcing fiber embedded therein, and an adhesive composition coating the fiber; the adhesive composition including a polyelectrolyte co-curable with the polymer matrix and a primer material compatible with the fiber and co-curable with the polyelectrolyte. The adhesive composition may include a curative compatible with the polyelectrolyte. In one preferred embodiment, the invention is an aqueous adhesive composition including water, an epoxy resin (preferably an epoxy aqueous dispersion or solution), a maleated polybutadiene derivative, and a curative.

The invention also relates to a carbon fiber, or other fiber material(s), tensile cord or other fiber forms treated with the inventive adhesive composition. The invention also relates to carbon reinforced products such as belts, hose, and the like which include the inventive treated tensile cord or fiber forms of reinforcement.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The present invention relates to an aqueous adhesive composition for treating a reinforcing fiber for bonding to a thermosetting polymer matrix. The adhesive composition includes: water as the solvent or dispersing medium; a polyelectrolyte co-curable with the polymer matrix; a primer material compatible with the fiber and co-curable with the polyelectrolyte; and optionally a rubber curative compatible with the polyelectrolyte and the polymer matrix. A fiber-reinforced, composite polymer system may thus include a thermosetting polymer matrix, a reinforcing fiber embedded therein, and an adhesive composition coating the fiber; the adhesive composition including a polyelectrolyte co-curable with the polymer matrix and a primer material compatible with the fiber and co-curable with the polyelectrolyte. The adhesive composition may include a curative compatible with the polyelectrolyte. In one preferred embodiment, the invention is an aqueous adhesive composition including water, an epoxy resin (preferably an epoxy aqueous dispersion or solution), a maleated polybutadiene derivative, and a curative.

Aqueous means the adhesive composition is delivered via a water-based system. The composition may be an aqueous solution, an aqueous dispersion, or an aqueous emulsion or mixtures thereof. The composition may be delivered to the fibrous material by any suitable treatment process, including dipping, spraying, roll or knife coating, brushing, or the like. Treating may be followed by drying under ambient or heated conditions to remove the water. Heating may be controlled to prevent premature curing of the adhesive or to provide for some degree of curing. Some degree of curing after treatment may be desired to control the tack or stickiness of the treated reinforcing fiber.

The polyelectrolyte may include unsaturation, providing cure sites in the polymer backbone or on side groups, and functional groups, such as carboxyl, hydroxyl, sulfonate, maleimides, amino groups, and the like, that may facilitate bonding with other functional groups or substrates. The polyelectrolyte materials may have "positively" or "negatively" charged functionality bonded to or surrounding them. Such polyelectrolytes may include but are not limited to, ionic monomers/oligomers/polymers, polymer electrolytes, poly(ionic) liquids, ionic elastomers, ionic surfactants, ionic co-agents. The adhesive composition may include polyelectrolyte material with multiple (i.e., more than one) functional groups or types as pendant electrolyte groups or side groups on the polyelectrolyte molecule, and may be a combination of multiple polyelectrolytes. The combination of polyelectrolytes may be realized by mixing the suitable polyelectrolytes or sequential addition of one to the other in wet or dry forms or by dipping, spraying, or hand lay-up methods.

Examples of suitable polyelectrolytes include: maleated polybutadienes or styrene-butadiene copolymers, sulfonated polystyrene or polybutadiene or styrene-butadiene copolymers, maleated ethylene-alpha-olefin-elastomers, and the like. "Maleated" herein means the polymer is grafted with maleic acid (i.e. "maleic-acid-grafted") (or grafted with maleic anhydride and then hydrolyzed to the di-acid) and then neutralized with a base such as NaOH, NH$_4$OH, KOH, etc. "Carboxylated" herein means the polymer is grafted with a carboxylic acid and then neutralized. Likewise, "sulfonated" herein means the polymer is grafted with a sulfonic acid and then at least partially neutralized. Thus, the anionic, organic-acid groups may be neutralized with alkaline, alkaline earth or transition metal cations, including for example zinc, sodium, aluminum, calcium, copper, iron, magnesium, potassium, lithium, etc. Other ionic groups that may be used include thioglycolate or phosphonate, and cationomers, e. g. containing quaternary ammonium groups. "Grafted" may be achieved by a grafting reaction that attaches the functional group to the polymer, or by copolymerization with a functional monomer. Preferred polyelectrolytes are water soluble, or at least easily water dispersible at levels up to about 30% by weight. The "maleate" (MA) content by weight may be in the range 1 to 30%; the number of MA groups per chain between 1-20 groups per chain. Polyelectrolytes with less than about 15 mole % ionic groups per chain are often categorized as "ionomers." Herein, polyelectrolytes are understood to include ionomers. The preferred polyelectrolytes may have 1 to 15 mole % ionic groups per chain, or from 5 mole % to 15 mole %. Molecular weight of the maleated polymer may preferably be between 3000 and 6000 Mn, and it may contain vinyl groups at content between 10-35%, preferably around 28% by weight. The solids content of the maleated polymer material in the aqueous adhesive formulation may be between 20-40% by weight, and the adhesive formulation may have pH between 4.0 and 12.0, preferably around about 8.0 to about 9.0; and viscosity at room temperature less than about 1000 cps. The maleated polymer may also come blended with or without surfactants to enhance the stability of a dispersion, which may have solid particles which are typically less than 500 nm in size. In such a case, the aqueous polyelectrolyte formulation may be considered to be an ionic latex (or ionomeric latex).

Exemplary polyelectrolytes for the adhesive composition are Ricobond® 7002 and Ricobond® 7004, sold under that trademark by Cray Valley. These are believed to be neutralized salts of maleinized (i.e., "maleated" as described herein) low molecular weight polybutadiene resins, presumably with relatively high levels of 1,2-polybutadiene linkages in the base polymer. The maleation levels are reported to be 5 and 11 functional groups per chain, respectively. They come as aqueous dispersions at solids content of 28-31 weight %, pH of 8.0-9.0, and having viscosities at 25° C. of <200 cps and <500 cps, respectively.

Maleated polybutadiene may also include polybutadiene grafted with maleic acid followed by esterification of one acid group and neutralization of the other acid group on each pendant maleic group. Alternately, the polybutadiene may be grafted with maleic anhydride followed by hydrolysis of the anhydride groups to the carboxylic acid and half-esterification and neutralization.

Other exemplary polyelectrolytes contemplated under this invention include maleated polypropylene such as Michem® Emulsion 91735, and maleated polybutadiene (BdMA) such as Michem® Emulsion 48625M1 which are available from Michelman, Inc.; a maleic anhydride adduct of a low molecular weight 1,4 cis-polybutadiene having succinic anhydride groups along the polymer chain such as Polyvest® MA 75 (or Polyvest® EP MA 120), or a hydroxyl-terminated polybutadiene version such as Polyvest® HT (or Polyvest® EP HT), both sold by Evonik. Others examples include various ionomers, such as butyl ionomer material such as X_Butyl™ I4565P from LANXESS; poly(sodium-p-styrenesulfonate); ionic acrylic polymer emulsions, such as Romax™ 7000 material by DOW. The Romax™ polyelectrolyte could be acid functionalized, neutralized with base, and may have either anionic or cationic charges. Polyelectrolytes that are also considered are metallic diacrylates including zinc diacrylates, example, Dymalink™ 633/634 products by Cray Valley; Dupont™ Surlyn® resins which are family of ionic ethylene-methacrylic acid copolymers that may contain acid functional groups and may be neutralized with metal salts such as zinc, sodium, etc.

Other polyelectrolytes contemplated for this invention include polymerizable ionic liquids and monomers. "Polymerizable" implies that that the material has at least one "unsaturated" bond or is cross-linkable to itself or another polymer using a peroxide or sulfur-cure system. For example, metallic salts of carboxylic acids such as zinc diacrylate, zinc dimethacrylate, and the like are exemplary polymerizable ionic monomers.

In general, the poly(ionic) chemicals encompass anionic and cationic polyelectrolytes including those that contain functional groups, such as, carbonyl, hydroxyl, amino, acrylic groups, etc. And number average molecular weight of such polyelectrolyte material may preferably be in the range 100 to 10000.

The primer material is a chemical or mixture of chemicals with known affinity for the fiber surface and reactive with the polyelectrolyte. For example, epoxy primer materials that are water soluble are generally preferred for use with carbon, glass fibers, etc., as sizing or finish on the fiber surface. Such epoxy primer material may primarily be prepared from or formulated based on epoxy type resins, such as glycidylamine type, novolak, cresol novolak, bisphenol A, F, and S, brominated bisphenol A, urethane-functionalized bisphenol A type resins, and others. Other primer material examples include water soluble or dispersible polyurethanes, polyvinyl alcohol, polyamides (e.g. nylon dispersion), polyethylene, silanes, polypropylene, vinyl acrylic acid copolymers, etc. The primer materials may be further functionalized with groups that facilitate affinity with fiber surface or that aid dispersion in water.

In embodiments of the invention, primer materials can include anionic and cationic surfactants, monomers or polymers with glass transition less than 120° C. and may have solid content <60%, viscosity <5000 cps, and pH between 2-12. The anionic-based primer materials may have groups such as sulfates, sulfonates, phosphates, carboxylates, etc. in their molecular structure. The cationic ones may include those based on primary, secondary, or tertiary amines, and quaternary ammonium groups.

Preferred primer material examples would depend on the fiber and rubber type. As an example, a primer for use with carbon fiber could be an epoxy or a polyurethane, with or without a curative. An epoxy or isocyanate-functional primer could be used with polyester or aramid fiber. A silane primer could be used with glass. Likewise the curative choice could depend on the rubber type. Sulfur or sulfur-accelerated curatives may be preferable for diene elastomers or other unsaturated polymers, while peroxide curatives may be preferable for saturated polymers such as EPM or HNBR.

Exemplary primer/sizing chemicals contemplated for use in practicing this invention include epoxies (aqueous dispersions) such as Hydrosize® EP834 and Hydrosize® EP876 sold by Michelman, Inc.; ethylene acrylic acid copolymer sold as Michem® Prime 2960 with ammoniated dispersion as an emulsifier; nonionic polyurethane sizings such as Hydrosize® U1-01, Hydrosize® U2-01, Michem® Dispersion Urethane 16, for sizing glass, polyester, and carbon fibers including chopped fibers; maleated butadiene (BdMA) with trade name Michem® Emulsion 48625M1 also for sizing on glass, carbon, and various fibers; polyamide (nylon) sizing sold as Hydrosize® PA845 all by Michelman, Inc.; ionic polyurethane dispersions, such as Astacin® chemicals sold by BASF, Roda® pur chemicals by TFL, Ruco®-PUR chemicals by Rudolf GmbH, and others.

An aspect of the invention involves formulating the adhesive composition so that it contains the same or similar sizing type chemical that is used as finish or sizing on the fiber surface, plus the polyelectrolyte material and the curative agents.

Curative means a reactive material which forms or facilitates the formation of crosslinks between polymer molecules in a thermosetting polymer matrix.

Crosslinking of the adhesive composition can be realized by peroxide cure, sulfur cure, thermal, or photo-irradiation processes and systems that may trigger generation of reactive intermediates, which may include, radicals, radical cations/anions which can cause polymerization of the adhesive composition and cross-linking to the thermosetting matrix, which may be, e.g., rubber or other elastomer or polymer. The curative may be sulfur, sulfur accelerators, peroxides, zinc oxide, bismaleimide, diamines, isocyanates, etc.

Exemplary curatives contemplated for use in this invention include peroxide curatives, for example, 2,5-dimethyl-2,5-di(t-butylperoxy)hexane generally sold under trade names Luperox® 101XL45 by Arkema Group and Varox® DBPH emulsion by R.T. Vanderbilt; and α,α-bis(tert-butylperoxy)diisopropylbenzene sold under the trade name Vul-Cup® by Arkema Group, and dicumyl peroxide sold under the trade name Di-Cup® by Arkema Group.

The sulfur-cure curatives or accelerators useful for the invention include benzothiazoles (e.g. 2-mercaptobenzothiazole; 2,2'-dithiobenzothiazole; 2-morpholinothiobenzothiazole), benzothiazole-sulfenamides (e.g. n-cyclohexylbenzothiazole-2-sulfenamide; n-tert-butylbenzothiazole-2-sulfenamide), thiurams (e.g. tetramethylthiuram disulfide), dithiocarbamates (e.g. zinc dimethyldithiocarbamate), and the like. These accelerators may be used in conjunction with one another or activators such as zinc oxide.

Other ingredients may be included as needed without particular limit. Other such ingredients include surfactants, stabilizers, pH modifiers, thickeners, antidegradants, dyes and pigments, fillers, softeners, processing aids, reodorants, and the like. Ingredients useful in conventional latex formulation as described in R.F. Mausser, ed., "The Vanderbilt Latex Handbook," R.T. Vanderbilt Company, Inc. (3d ed., 1987) may also be used.

The composition may also include fillers (e.g. carbon black, graphite, graphene, graphene oxide, silica, clay, carbon nanotubes, organic and inorganic nanofibers and nanoparticles, such as those of cellulose nanofibers, aramid nanofibers, metallic-based nanoparticles, semi-conductor and quantum dot nanomaterials, etc.), coagents (e.g. type I and type II coagents), and the like.

It is believed that addition of the primer material (such as a sizing or sizing-compatible material) as part of the adhesive composition enables better interaction/wetting/bonding of the adhesive composition to the fiber surface, thereby, allowing better adhesion to the surface. Scanning electron micrograph (SEM) images of carbon fibers of greige (untreated) fibers versus inventive-adhesive-treated versus conventional latex-adhesive treated fibers showed greatly improved wetting and adhesive coverage on the fiber surface with the inventive adhesive composition. The sizing/primer material reaction with the polyelectrolyte and/or bonding of the adhesive to the fiber surface may involve formation of covalent bonds, hydrogen bonding, electrostatic, van der Waals, or π-π bonding interactions. The primer material may react first with the polyelectrolyte or simultaneously with the fiber surface (with or without sizing on the fiber). The primer content of the adhesive composition may be chosen to achieve a final sizing content on the fiber of between 0.2-2% by weight. Notably, the fiber may or may not have sizing applied to the surface by the manufacturer.

Once the adhesive composition is applied to the fiber surface, the curative then facilitates cross-linking of the polyelectrolyte to the polymer/elastomer/rubber matrix thereby ensuring adequate bonding of the adhesive composition to the both the matrix and the fiber surface. This preferably does not occur during drying of the treated fiber, but does occur during a vulcanization or crosslinking step when in contact with the elastomer matrix.

Notably, the adhesive composition need not be blended with, or may be entirely free of, traditional non-ionic latex (e.g. HNBR, VPSBR, CR or neoprene, NBR, XNBR, etc.), nor need it contain resorcinol, phenol, formaldehyde or RF or PF resins. Based on results from extensive adhesion testing, embodiments of the adhesive composition give superior compatibility and adhesion of carbon fiber to various rubber materials including nitrile (NBR) and hydrogenated nitrile rubbers (HNBR), ethylene-alpha-olefin elastomers (such as EPDM, EPM, EOM, etc.), polychloroprene rubbers (CR), and the like which can be vulcanized by peroxide or sulfur-based curatives. The adhesive composition may be considered more broadly applicable than other types of adhesive compositions known in the art because many prior adhesive systems rely on inclusion of specific latex material, in part to provide compatibility to a specific rubber type.

It is also noteworthy that conventional RFL adhesives are more selective with regards to the cord or fiber type, rubber type used, and/or application. For example, some RFL adhesives may be suitable for one fiber type but not suitable for another due to differences in fiber surface sizing, or molecular nature of the fiber. Although the chemistry of RFL adhesives is well-known in the art, achieving good adhesive bonding typically may require several modifications to the RFL adhesive (e.g. changing the latex type), or the treatment process conditions, careful selection of a primer treatment, or even modification to the rubber compound. These challenges may make RFLs less optimal for use on wide variety of cords and more complicated for use in more demanding commercially viable goods, for instance belts, where superior adhesion plays vital part in flex fatigue and extended lifetime.

The adhesive composition may be applicable to a wide variety of reinforcing fibers used in rubber and polymer composites. These fibers include carbon fiber, glass fiber, boron fibers, ceramic fibers, metallic fibers, natural fibers such as cellulosic fibers, and synthetic organic fibers such as aramids, polyamides, polyesters, polyolefins, polyurethanes, acrylics, modacrylics, vinylon, polyarylenesulfides, polyetherketones, and the like. The carbon fiber may be any kind of carbonized cellulosic fiber or synthetic fiber.

The fibers useful in or with this invention may be monofilaments or continuous multifilament or staple fiber strands, yarns, or cords. The fibers may be dispersible short fibers including chopped or fibrillated fibers. The fibers may be in the form of fabrics, including woven fabrics, knit fabrics, or non-wovens. The fibers may be in any combination or hybrid of the aforementioned types of fibers or forms. In particular embodiments, the fibers are in the form of twisted tensile cords, coated by immersion (dipping) in the adhesive formulation. Such treated cord may be used as tensile cords for embedding in the rubber or polyurethane main body of a power transmission belt or conveyor belt. Examples of such power transmission belts include toothed or synchronous belts, V-belts, and flat belts.

According to various embodiments of this invention, fibers or cords having the adhesive composition may have reactive polar functional groups (e.g. carbonyl, and hydroxyl groups) which can bond to urethanes, polyurethanes, or form products by reacting with isocyanates, isocyanate prepolymers, polyamides, etc. It is believed that the inventive adhesive composition may not only be applied to various tensile cords for superior adhesion, but to fabrics or flat tows making it quite suitable for wet filament winding processes which may be accomplished by dipping or spraying methods. In summary, fiber treated with the adhesive composition is capable of providing adequate bonding to a variety of thermoplastic and thermoset elastomeric products or goods—goods such as, power transmission belts, conveyor belts, hoses, filament wound pressure vessels, tires, etc.

The chemistry of the inventive adhesive composition and a proposed mechanism for adhering to a thermosetting matrix (e.g. rubber) and a fiber surface are depicted in the formulae below.

Formula I illustrates a generic structure of a bisphenol A type epoxy chemical used for sizing finish on carbon and other synthetic fibers. These epoxy resins are formed by reacting epichlorohydrin with bisphenol A to form diglycidyl ethers of bisphenol A. The simplest resin of this class is formed from reacting two moles of epichlorohydrin with one mole of bisphenol A to form the bisphenol A diglycidyl ether (n=0 in Formula I). The less epichlorohydrin used, the larger n is, the higher the molecular weight, and the less epoxy functionality in the molecule (by weight) since the epoxy groups are just at the ends. The epoxy resins may further be prepared in aqueous forms by dispersion in water at up to 70% by weight, and said dispersions may contain film formers, and relevant surfactants that aid in stability of the dispersions against, for example, particle aggregation.

Formula I

Reactive sites     Adhesive reactive sites     Heat resistance Formula II illustrates a possible reaction of an epoxy-type primer chemical with maleated polybutadiene. The epoxy groups at the ends of the epoxy resin are not shown. Also, the polymeric form of MA-PBD (maleated polybutadiene polyelectrolyte or ionomer) shown is based on 1,4 polybutadiene with some 1,2-vinyl content. This Formula II captures the gist of the chemistry involved in the inventive adhesive composition. Ultimately, the adhesive composition is the reaction product of a polyelectrolyte co-curable with the polymer matrix and a primer material compatible with the fiber and co-curable with the polyelectrolyte, and optionally a curative compatible with the polyelectrolyte or the elastomer matrix. The resulting composite material is ultimately the reaction product of the polyelectrolyte, the primer material, the fiber surface, and the polymeric matrix material, and the optional curative.

bisphenol A type epoxy is shown in Formula I. Notably, epoxy resins are well-known in the art as chemicals for sizing or finishing on many natural and synthetic fibers used in the industry. Therefore, it is contemplated that the sizing chemical in the adhesive formulation (e.g. epoxy) will be highly compatible with many natural and synthetic fibers, with the epoxy groups reacting to anchor the adhesive to the fiber surface. In addition, the primer material can react with the polyelectrolyte chemical, shown e.g. as MA-PBD in Formula II. For example, the reactive hydroxyl groups of the epoxy chemical may react with the carboxyl group of the MA-PBD derivative by nucleophilic addition. Thus, as previously mentioned, it is also possible that the epoxy primer can both aid wetting of and bonding to the fiber surface and reacting with the polyelectrolyte which can bond to the polymer or rubber matrix. Finally, FIG. 1 depicts a Formula II FIG. 1 illustrates a polymer composite system 20 including an embodiment of the adhesive composition 23 attached to fiber surface 22 by epoxy-based linkages 24 and cross-linked via peroxide or sulfur-based curing agents 25 to rubber matrix 26.

Figure 1:
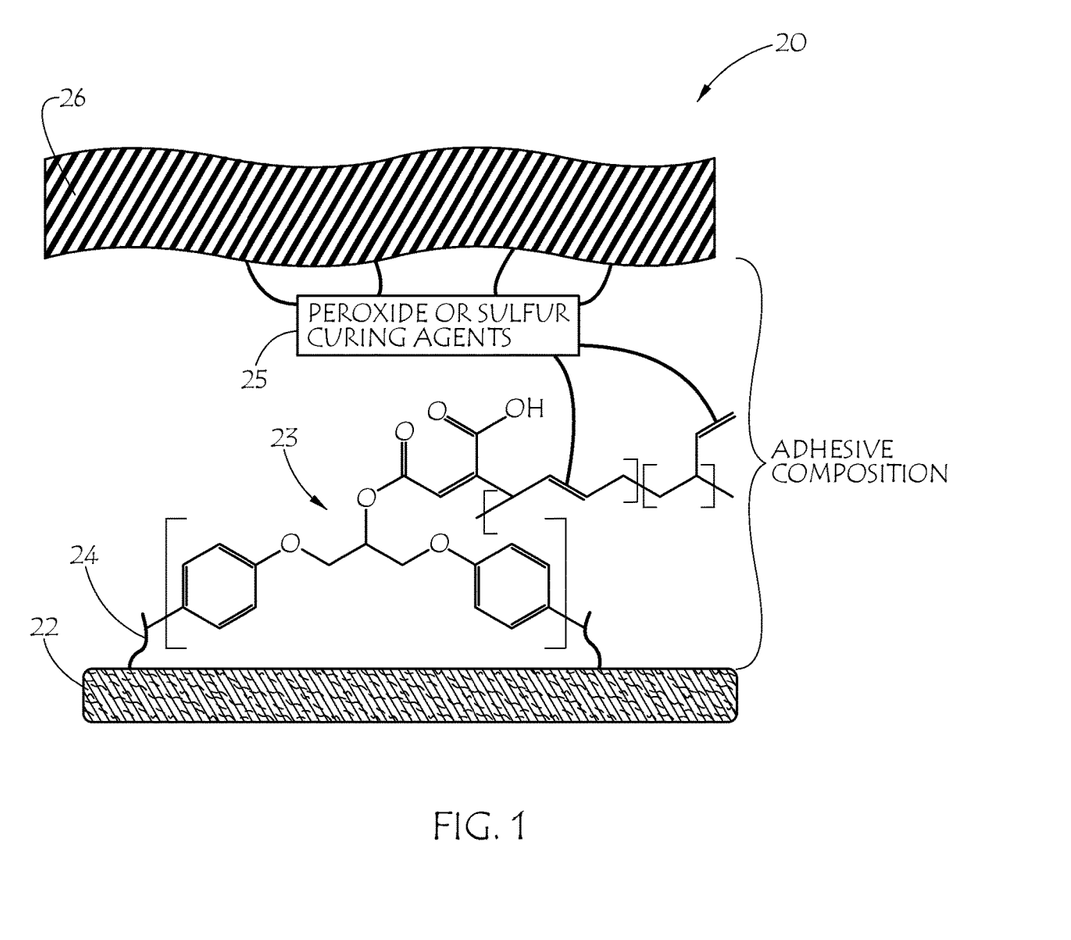
FIG. 1 schematic representation of the chemistry and use of an embodiment of the invention.

Formulae I-II and FIG. 1 thus illustrate an embodiment of the invention. As an example of the primer material for the adhesive composition, a generic chemical structure of a view of how the adhesive composition adheres to the surface of a fiber and cross-links to a rubber matrix via unsaturation or reactive hydrogens in the polyelectrolyte.

It may be noted that an optional conventional overcoat adhesive may be applied to fiber treated with the inventive adhesive composition for enhancing compatibility to a polymer matrix or other material which may be particularly difficult to bond to.

Examples

An exemplary aqueous adhesive composition was mixed up on a wet weight basis consisting of 86.7% Ricobond® 7002 as the polyelectrolyte (30% solids), 4.8% Hydrosize EP834 from Michelman as the bisphenol A epoxy resin (60% solids), 0.7% Luperox® 101XL45 from Harwick as the peroxide curative (45% solids), and 7.8% additional distilled water. This is referred to as the inventive adhesive in the results that follow.

Comparative adhesives were also mixed. A comparative HNBR RFL adhesive was prepared using conventional RFL technology. A comparative HNBR-latex adhesive was prepared using commercially available latex, curatives and adhesion promoters. Likewise a comparative CR-latex adhesive was prepared.

Each of the adhesive formulations evaluated were prepared under the same conditions and each contained about 30% solids. An aliquot of each of the aqueous formulations was dried and cured at 170° C. for 30 minutes for testing in solid film form. The inventive adhesive and comparative adhesives were used to treat carbon fiber tensile cords having an intended ultimate use in HNBR and EPDM power transmission belts. The cords were tested for tensile strength and adhesion to HNBR and EPDM rubber using conventional rubber formulations and test methods.

Cord adhesives must have good thermal resistance so as to withstand high temperature conditions experienced during belt manufacturing and in application where belt temperatures may exceed 120° C. Thermogravimetric analysis (TGA) and differential scanning calorimetry (DSC) characterization methods were employed to compare thermal stability of the inventive adhesive composition to other adhesives known in the art.

Table 1 shows data for the glass transition and thermal stability comparisons of cured films of the inventive adhesive versus RFL and latex-based adhesive systems.

TABLE 1

| Adhesive | Onset of weight loss from TGA, ° C. | Glass transition temperature from DSC, ° C. |
|---|---|---|
| HNBR latex-based | 270 | −25 |
| HNBR RFL | 220 | −25 |
| CR latex-based | 240 | −45 |
| Inventive adhesive | 275 | <−90 |

It can be seen that the inventive adhesive composition displays better or comparable thermal stability in comparison to the conventional RFL and latex-based adhesive systems as indicated by the onset of weight loss of the cured material. Interestingly, the inventive adhesive also displayed the lowest glass transition temperature which may imply that the inventive adhesive composition could maintain its adhesive performance and/or stability across a wide range of temperatures, example, from −120° C. to greater than 250° C. which may make it an excellent adhesive composition of choice for use in fiber reinforcements in a wider range of applications, ranging from power transmission belts or other reinforced products that are designed for use in sub-zero temperatures to those where the product typically experiences very high temperatures. Moreover, improvements in thermal stability, or environmental resistance, or the like, may be realized by manipulations of the adhesive composition, its constituents or material processing conditions without deviating from the scope of the invention as described herein. For instance, ratios of the constituent chemicals in the formulation may be varied during mixing, fillers and new chemicals may be added for enhanced performance, and temperature conditions may be adjusted to suit material handling and/or processing. An example of a belt application where elevated temperature conditions (as well as very low temperatures) are generally experienced is in the continuously variable transmission (CVT) belt applications.

CVT belts are used in many vehicles including recreational ATV/UTVs, scooters, snowmobiles, and others. CVT systems have been discussed in detail in U.S. Pat. No. 8,672,788 B2, for example. In general, as two pulley halves move axially apart or together to force a change in belt radial position, the belt may be subjected to extreme friction forces as the belt changes radial position within the sheaves. As two sheave halves move together axially to increase the pitch line of the belt, the belt is subjected to extreme friction forces and to high axial or transverse compressive forces. High and variable torque loads result in high tension forces and high wedging forces which also result in high transverse compressive forces on the belt. Some drive applications use the belt as a clutch, resulting in additional frictional forces on the contact surfaces of the belt. These forces may be most severe in a CVT because of the dynamics of the applications (e.g. frequent, rapid shifts, with high acceleration loads). As the CVT belt traverses the driver and driven pulleys, it is also subjected to continual bending or flexing. Rubber CVT belts are generally used without lubrication in so-called "dry CVT" applications. Therefore, a CVT belt must be designed to have good longitudinal flexibility, high longitudinal modulus, high abrasion resistance, high transverse stiffness, and the belt must operate for a long period of time across a wide temperature range. Of course, snow mobile CVT belts generally start out at very low temperatures, so low-temperature flexibility is also required.

Initial assessments of the adhesive properties of the adhesive composition were carried out using a test method similar to standard ASTM D4776 (i.e., an H-test for reinforcing cord to rubber adhesion). Application of the adhesive to the cord was realized by conventional cord treating processes known in the art.

The term "cord" is utilized in this disclosure to designate combination of one or more yarns that may be twisted as is known in the art, and where two or more yarns are employed, may moreover be laid or bundled or twisted together and treated with a binder or adhesive for use in a reinforced rubber product, such as a belt. In an embodiment of this invention and for proof-of-concept purpose, the inventive adhesive composition was applied to carbon fiber tow by dipping the tow in a dip-tank containing the adhesive, then drying the dipped tow in an oven to remove excess water. The treated tow may then be twisted on its own or plied/bundled/cabled with another tow of the same or dissimilar fiber type. Description of a cord treating process in greater detail is in U.S. Pat. No. 8,672,788 B2, the contents some of which are hereby incorporated herein by reference. Typically, dipping the tow in the adhesive and drying in oven takes about 0.5 to 5 minutes, and preferably 1-3 minutes. Drying temperature is typically in range 100-130° C. In an embodiment of this invention, the dip pick up (% DPU) of the adhesive may range between 5% to 20% of the final dry weight of the treated cord. The twisting process is done using methods, machines, or set-ups that are known in the art. The twisted cord may or may not be further coated with additional adhesive layers, generally known as "overcoat" or "overcoat adhesive" which is primarily intended to coat the outside of the cord for enhanced adhesion to the rubber matrix or environmental protection of the cord. Overcoat % DPU may generally range from about 1% to about 10% dry weight, based on the final weight of the so treated cord. Examples of useful overcoat adhesives are found in the art and may include various compositions sold under the trademarks CHEMLOK by Lord Corporation, and various compositions sold under the trademark CILBOND by Chemical Innovations Limited (CM), or the MEGUM™, THIXON™ and ROBOND™ adhesives sold by The Dow Chemical Company. The particular overcoat may be chosen to be compatible with the rubber matrix or belt body and to have other desired properties such as heat resistance, or resistance to moisture or ozone. It should be understood that the adhesive composition and corresponding cord treating process may equally be applicable to other fibers/cords including glass fibers, polyester, aramid, basalt, PBO, and the like, or hybrids thereof.

Carbon fibers are known for their excellent tensile, high stiffness and high modulus properties, and as a result, have continued to gain interest as fiber reinforcement of choice in many high performance/advanced fiber reinforced composite articles and goods. Recent advances in belt design having carbon tensile cords demonstrate significant improvement in load-carrying capability, better belt life, greater axial stiffness and dimensional stability of the belt than those having glass or aramid or polyester tensile cords as reinforcements. Although, use of carbon fiber for rubber reinforcements such as in belts or tires has been presented years ago, there are still challenges encountered in manufacturing suitable carbon cord for broad commercial applications. One aspect of this is the difficulty in developing suitable adhesive that can provide sufficient bonding to the surface of carbon fibers. This may be because, unlike the other aforementioned fibers, carbon fibers lack active functional groups in their molecular structure that may have facilitated bonding to an adhesive material. And although sizing chemical applied to the fibers by manufacturers may enhance bonding to an adhesive, the sizing primarily aids in handling so as to prevent fiber damage during transportation, storage, or winding around spools or pulleys. It is even more difficult to achieve adequate penetration and bonding of the conventional adhesives, whether in solvent or aqueous forms, into a pre-twisted carbon yarn. Furthermore, the carbon fibers are more prone to forming fuzz or fraying during cord treatment process.

According to embodiments of this invention, the carbon fiber tow size may range from 100 to 100,000 filaments, although most commercially available fibers are within 1000 to 48000 filaments. The carbon fiber yarns are generally abbreviated as 1K, 6K, 12K, etc. to represent the number of filaments in the yarn, where "K" denotes 1000 filaments and the number, e.g., 12, designates a multiplier (i.e., 12K=12,000 filaments). The 6K and 12K yarns are probably the most economical grades commercially available. The term "tow" is used generally to indicate a zero-twist greige yarn. Combined tows are indicated with a second number such as 12K6, which means 6 yarns of 12K each combined.

Another important characteristic of an adhesive for use on tensile cords is maintaining good environmental resistance, for instance, resistance against humidity, moisture, ozone, UV radiation, etc. It is known in the art that ozone can degrade elastomeric materials by attack on the unsaturation which leads to cracking or decrease in cross-linking ability of the material. Thus, when an elastomeric adhesive loses its ability to cross-link it may be inferred that adhesion to a matrix (e.g. rubber) will be dramatically decreased.

Therefore, we assessed environmental resistance of the inventive and comparative adhesive compositions after application on a 12K carbon fiber tow, followed by twisting of the tow, and subsequent evaluation of cord adhesion in a rubber matrix. Adhesion of tensile cords in power transmission belts, and the like, play an integral role in performance and durability of the product. Sufficient adhesion of the cord to the belt body has to be maintained throughout the service life of the belt, otherwise the belt may experience early failures. This is because excellent cord adhesion to the rubber body makes possible efficient load transfer from the belt to the tensile cords contributing to efficient transmission of power.

For comparative analysis, control cord samples with a traditional non-ionic latex-based treatment (e.g., latex+curative) were also prepared. The treated carbon cord samples were exposed to ozone and humidity conditions in a controlled chamber for 24 and 48 hour time periods in order to simulate some of the harshest conditions that tensile cords may encounter during transport, storage, or use in the lab or belt plants. Test conditions included: ozone concentration at 50 mPa partial pressure (0.6 PPM), and at a temperature of 104° F. (40° C.); and 80% relative humidity at 95° F. (35° C.). After exposure of the cord samples to these conditions, the cords were placed between rubber layers, preferably under some tension, and subjected to vulcanization in a heated hydraulic press or oven chamber. After curing, the cord-in-rubber slabs were sectioned into several samples, each sample, having a 'T-shape' with rubber block as the 'head' and cord, 'tail'. Cord adhesion is then assessed by measuring the force required to pull the cord out of the rubber block. This lab test is akin to standard ASTM D4776 (H-test for reinforcing cord to rubber adhesion) which may be carried out on an universal tensile test machine. The measured force is used quantitatively to characterize degree of adhesion of a given treatment and/or cord to a given rubber. The cord's failure mode when it is pulled from the rubber may also give qualitative assessment of adhesion. There may be other factors that may influence the measured force, such as, modulus of the rubber compound, diameter/gauge of the cord, testing temperature, etc., so these were held constant as much as possible.

For initial evaluations of adhesion, EPDM rubber was used and all adhesion samples were prepared under the same conditions with only difference being the adhesive treatment on the cord. Diameter of the treated cords did not change with treatment, and typically may be in the range 0.8 to 1.2 mm, but preferably about 1.0 mm. Table 2 shows adhesion values of the carbon cord samples after exposure to humidity and ozone conditions. Although there was no appreciable difference in initial tensile strength of the cords, it can be seen the inventive adhesive performs better after aging. High humidity and ozone levels did not have any significant effect on adhesion of the carbon cord with the inventive adhesive composition, and the inventive adhesion values were higher than those from the control cord.

TABLE 2 shows a comparison of cord adhesion between inventive adhesive and latex+curative adhesive after exposure of treated carbon cords to ozone and humidity conditions.

TABLE 2

Cord Adhesion (N).

| Example | Cord tensile strength (N) | Initial[1] | Ozone Exposure 24 hrs | Ozone Exposure 48 hrs | Humidity exposure 24 hrs | Humidity exposure 48 hrs |
|---|---|---|---|---|---|---|
| Inventive adhesive treated carbon cord | 1381 | 425 | 350 | 360 | 370 | 365 |
| Latex-based adhesive treated carbon cord | 1343 | 342 | 300 | 290 | 250 | 321 |

[1]Initial adhesion of the cords before exposure to ozone and humidity. Adhesion testing was done at room temperature.

As previously mentioned, carbon fiber tow sizes can get as high as 48K filaments, however, larger diameter cords may be constructed by combining multiple tows/cords of a given tow size. For example, 12K4 construction would be combination of four 12K tows/yarns which may be realized by plying/cabling/twisting together the four tows/cords. This "combination" of tows/cords to produce a larger gauge single cord may be done in stages where, for example, each tow is twisted first in a given direction, and then plied together in another given direction. Herein, "direction" implies the tow/cord may be helically twisted in the S or Z direction.

These larger gauge carbon cords are typically needed in high load, high durability timing belt drive applications where excellent cord adhesion to the rubber matrix is extremely vital for the belt's performance. Thus, 12K4 treated carbon cords were manufactured and evaluated for adhesion at room and elevated temperatures to EPDM and HNBR rubber compounds as shown in Tables 3 and 4, respectively.

TABLE 3 shows the results of adhesion testing with 12K4 carbon cords and with glass cord to EPDM and HNBR rubbers at room temperature (23° C.). Both cord types had similar diameter. The adhesion values are in Newtons. TABLE 4 shows the results of adhesion testing with 12K4 carbon cords and with glass cord to EPDM and HNBR rubbers at elevated temperature (85° C.).

TABLE 3

| Examples | | RT Adhesion (N) and observations | | | |
|---|---|---|---|---|---|
| Cord Type | Adhesive | EPDM Cpd. 1 | EPDM Cpd. 2 | EPDM Cpd. 3 | HNBR Cpd. 1 |
| Carbon | Inventive | 789 (Stock tear) | 911 (Stock tear) | 909 (Heavy stock residue on cord) | 718 (Stock tear) |
| Carbon | Latex-Based | 586 (Light stock residue on cord) | 543 (Light stock residue on cord) | 696 (Loss of adhesive) | 554 (Loss of adhesive) |
| Glass | RFL | 529 (No stock residue on cord) | 676 (Light stock residue on cord) | 588 (Light stock residue on cord) | 568 (Loss of adhesive) |

TABLE 4

| Examples | | Hot Adhesion (N) and observations | | | |
|---|---|---|---|---|---|
| Cord Type | Adhesive | EPDM Cpd. 1 | EPDM Cpd. 2 | EPDM Cpd. 3 | HNBR Cpd. 1 |
| Carbon | Inventive | 375 (stock tear) | 635 (Light stock residue on cord) | 444 (Light stock residue on cord) | 375 (stock tear) |
| Carbon | Latex-Based | 318 (Light stock residue on cord) | 321 (Light stock residue on cord) | 344 (Loss of adhesive) | 318 (Light stock residue on cord) |
| Glass | RFL | 288 (No stock residue on cord) | 463 (Loss of adhesive) | 400 (Loss of adhesive) | 288 (No stock residue on cord) |

Figure 2:
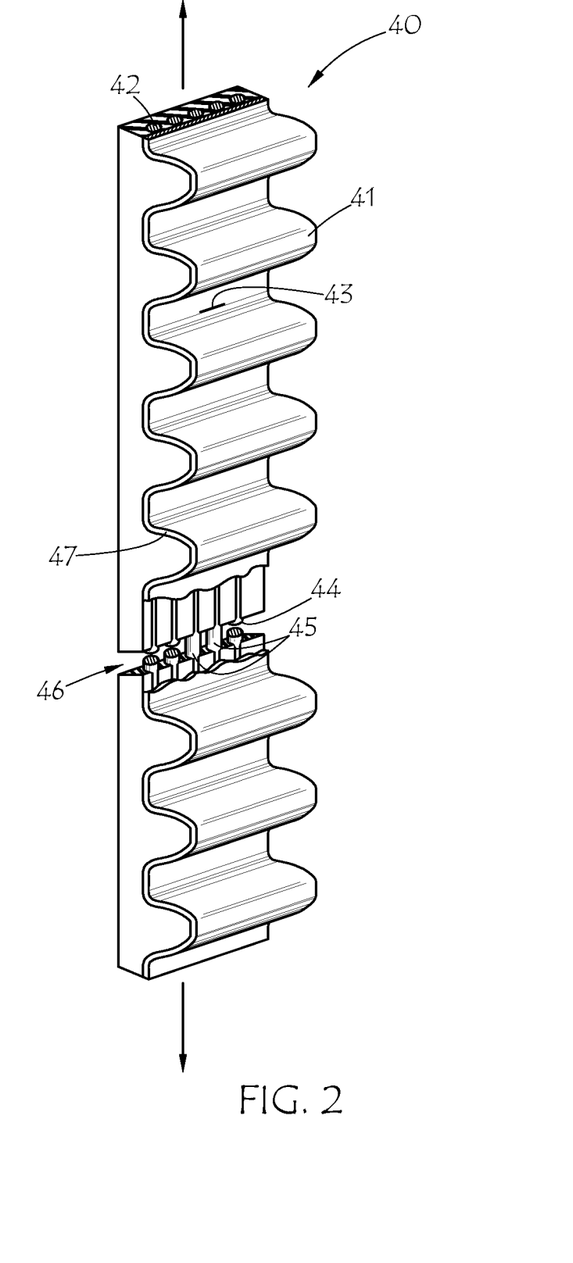
FIG. 2 is a perspective view of a cord-adhesion test specimen of a toothed belt.

It can be seen that the inventive adhesive gives significantly higher adhesion than the other adhesives at room temperature and even at the elevated temperature. These adhesion results enabled further evaluation of the treated cords in an actual belt, such as a CVT belt. In general, belt making process may include building up the various layers of textiles, elastomers, and tensile members, upright or inverted, on a cylindrical mold or on a mandrel for transfer to a mold. The tensile cord may be helically wound about the mandrel with a predetermined cord spacing or number of ends per unit width. The mold may have the cog profile formed therein and/or so-called "matrix" may be used to produce a cog profile. After curing or vulcanization to form a slab, individual belts may be cut and/or ground therefrom with the proper contact surface V-angle or angles and inverted if necessary. Table 5 shows cord adhesion from EPDM CVT belt samples. For this testing, force required to pull 2 cords out of the belts is measured on an universal tensile test machine. Sample preparation for the test is illustrated in FIG. 2 and may be described as follows: a belt portion 40 is cut to about 4" long (11-12 teeth 41); a single edge razor blade may be used to cut through the fourth tooth from one end (at 46). The cut tooth may be grabbed with a pair of pliers and the belt end closest thereto also grabbed with pliers. The fabric is pulled away from the tooth and through the land area; the two center cords 45 marked with a paint pen; then three teeth are counted and a mark made in center of land area 43 as shown in FIG. 2. A first cut is made through cords 44, all but the 2 center cords, in the area where the fabric was removed (at 46), and a second cut 43 is made through the two center cords in the land area three teeth away from the first cut. The specimen is placed in the test grips and pulled as indicated by the arrows in FIG. 2. The test is stopped after peak load/force is reached. The test may be carried out in a similar way on any toothed belt including cogged or notched V-belts.

The results of the two-cord pullout test on CVT belt samples are shown in Table 5. The inventive adhesive performs comparably to the two comparative adhesives both at room temperature and at elevated temperature.

TABLE 5

Two-cord pullout adhesion (N) from CVT belts.

| Cord | Adhesive treatment | Two-cord pullout adhesion (N) | |
|---|---|---|---|
| | | 23° C. | 120° C. |
| Carbon | Inventive adhesive | 910 | 343 |
| Carbon | Latex-based | 976 | 243 |
| Aramid | RFL | 908 | 411 |

The inventive adhesive composition was also applied to fabrics and other cord types, such as aramid, where compatibility was assessed by testing the treated fabric and cord samples for adhesion against various rubber compounds. Cord treatment for aramid was done as described previously, following standard cord treating methods/processes known in the art. The inventive treatment again performed comparably to conventional adhesives. The aramid was specifically Kevlar® 119, from DuPont.

Fabric treatment was done by dipping 1"×4" sample of the fabric in the adhesive formulation for a given time period, preferably 2-5 minutes, drying the sample in an oven at 121° C. to remove the water, and measuring % DPU (dip pick up by weight) of the adhesive. Other treating methods for the fabric, such as spraying, hand lay-up, and/or air drying conditions may also be applicable. Overcoat/cement material may be applied to the treated fabrics by dipping treated fabric in the overcoat formulation, drying to remove the overcoat solvent, and measuring % DPU. Preparation of pad samples for testing adhesion on the fabrics was accomplished by sandwiching two fabrics alternately between three nitrile rubber layers with a Mylar film placed at the top part of the middle rubber (i.e. Rubber-Fabric-rubber-Mylar film-Fabric-rubber). The adhesion pad assembly was subjected to curing at 176° C. for 30 min, and testing done on a universal tensile tester machine at 50 mm/min speed and about 50 kN load cell. The adhesion results for the aramid cord and carbon fabric samples are shown in Tables 6 and 7, respectively.

TABLE 6 shows a comparison of cord adhesion with the inventive adhesive versus RFL on aramid cord. The inventive adhesive, even without an overcoat cement, provides significantly better adhesion than the RFL+overcoat system.

TABLE 7 shows a comparison of fabric adhesion with the inventive adhesive versus conventional latex adhesives on carbon fiber fabric. The inventive adhesive again provides the highest adhesion numbers in this test series.

The higher adhesion value and 'stock tear' failure mode observed from the aramid cord treated with inventive adhesive over the standard aramid cord, which is currently used in many commercial power transmission belt constructions, indicates that the inventive adhesive composition may be suitable alternative to RFL adhesives for treatment of tensile cords, including but not limited to cords with polar molecular structure, such as, polyester, glass, and other hybrid cords.

Based on the fabric adhesion tests, it is evident that the inventive adhesive composition may not only be applied to various tensile cords for superior adhesion, but to fabrics and/or flat carbon fiber tows potentially making it quite suitable as adhesive treatment for wet filament winding processes by dipping or spraying methods.

TABLE 6

| Cord | Adhesive Treatment(s) | Adhesion to EPDM rubber (N) | Comments |
|---|---|---|---|
| Aramid | Isocyanate primer + VP-SBR RFL + Overcoat cement | 235 | Stock residue on cord |
| Aramid | Isocyanate primer + inventive adhesive | 328 | Stock tear |

TABLE 7

| Fabric | Adhesive Treatment | Adhesion to NBR rubber (N) | Comments |
|---|---|---|---|
| 12 K Toho | Inventive adhesive | 221 | Stock tear |
| G30-700 Carbon | HNBR RFL | 210 | Stock tear |
| | Latex-Based | 185 | Stock residue on cord |

While achieving excellent cord-to-rubber adhesion is needed for enhanced belt life, it is equally paramount for the cord to exhibit good flex-fatigue to maintain performance particularly in belt applications where severe belt bending occurs throughout the service life. Realizing the right balance of excellent cord adhesion and belt flex-fatigue has been a fundamental challenge in many belt designs, in part because most of the conventional adhesives systems become relatively rigid within the cord bundle and at the cord-rubber body interface after vulcanization. As a result, when such belt is subjected to repeat flexing or back bends the adhesive layer becomes more brittle and delaminates leading to belt failures. Failure modes may include cord tensile failure, adhesive delamination, edge-cord pull, etc. Therefore, an adhesive system that can provide both excellent cord adhesion and flex-fatigue is needed especially for use with high modulus, high stiffness tensile members such as carbon cords.

Figure 3:
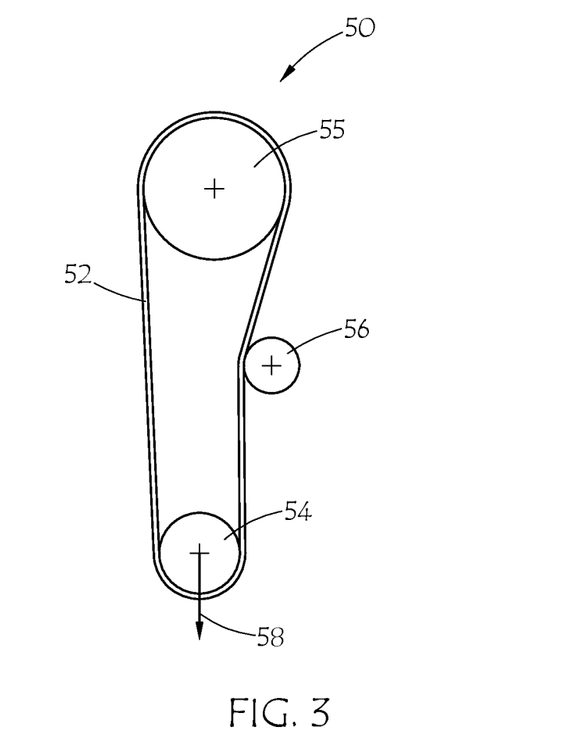
FIG. 3 is a schematic layout of a flat belt flex test.
Figure 4:
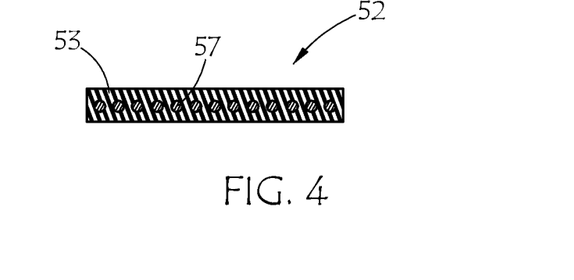
FIG. 4 is a cross section of a flat belt used in the test of FIG. 3.

Flex fatigue evaluation of the treated carbon cords 57 was done on flat belt 52 constructions as depicted in FIGS. 3 and 4 in order to minimize effects from the belt rubber compound, tooth and angle profiles of a toothed belt. The flat belts 52 were constructed with EPDM rubber compound 53 and tested using modified "deadweight" test methods. A layout of the test rig 50 is shown in FIG. 3. The flat belt 52 is approximately 1340 mm in length, about 5.8 mm thick and 19 mm wide. Diameters of the driver pulley 54 and driven pulley 55 were kept the same at about 100 mm; the back idler 56 diameter was about 75 mm, and the belt held under tension at hub-load 58 of about 1800 N.

Performance evaluation of the flat belts was done by measuring the belts' tensile strength decay and monitoring belt running temperature after running the belts for given time periods. Specifically, the cord's retained tensile was calculated based on the belt tensile and number of cords within the width of the belt. Results may be reported as tensile per cord (N/cord) or as percent retained cord tensile as shown in Table 8. Interestingly, the carbon cord treated with the inventive adhesive composition shows the highest percent retained cord tensile after 100 hours of belt testing, 10% higher than the carbon sample treated with latex-based adhesive. All the belt samples displayed similar belt running temperatures.

It is noted that stiffer treatments/cords/belt composites generally tend to give higher belt running temperatures due the extra force required to bend the belt, thus, the additional force typically translates to heat generation (increase in temperature), friction, or noise. It is also generally understood that high belt running temperatures may be detrimental to the lifetime of the belt.

TABLE 8 shows a comparison of flex-fatigue and belt running temperature of carbon cord flat belts with inventive adhesive treatment versus non-ionic latex-based treatment on carbon cords. The belt with inventive cord treatment runs slightly cooler and with less tensile degradation than the comparative belt with latex-based cord treatment.

TABLE 8

| Cord Type | Adhesive Treatment | Belt Running Temp, °C. | % Retained Cord Tensile @ Various Belt Run Time Periods, % | | |
|---|---|---|---|---|---|
| | | | Initial (0 hours) | 20 hours | 100 hours |
| Carbon | Inventive adhesive | 47 | 100 | 96 | 94 |
| Carbon | Latex-based | 48 | 100 | 89 | 84 |

Additional durability belt testing was done on toothed CVT belts with carbon cords treated with the inventive adhesive composition. Belts with carbon cords treated with conventional latex-based adhesive, and aramid cords were also used as control belts. Some commercial CVT belts having aramid-corded belts were tested for comparison.

One of the durability tests conducted is the Fired Engine Test which is a modified belt durability test that simulates operating conditions of engine/clutch drive systems in commercial ATV/UTV machines and other CVT drive platforms. The test belts were built in sizes that fit in commercially available ATV/UTV vehicle drive systems. The "# of cycles to failure" in Table 9 represents an average of at least five belts for each sample set. Fifty belt cycles is equivalent to 2.5 hours on test. The test engine power setting was about 70HP at speed of about 7400 RPM, and absorber torque of about 37 lbf. The driver and driven RPMs were about 9200 and 9800, respectively, with a cycle of 30 seconds loaded and 30 seconds at idle. Performance of the belts was evaluated based on number of cycles to failure and the failure modes. The Fired Engine Test is believed to be useful to screen different belt materials and designs and for belt performance analysis including prediction of field results.

Table 9 shows durability performance of three EPDM belts with carbon cord reinforcements. Carbon cords with the inventive adhesive treatment are compared to those with a latex-based adhesive. Significant durability improvements were obtained with the inventive adhesive composition over comparative EPDM/carbon CVT belts—78 hours versus 11 hours. A favorable comparison also results against a commercially available CR CVT belt having carbon cord. Unlike the comparative belt samples, the inventive adhesive-carbon cord belt sample did not shatter at point of failure, but experienced only cracks at the tooth of belt compound. This failure mode accompanied by the highest number of cycles is a good indication of the superior adhesive performance of the inventive adhesive composition over the conventional latex-based adhesives.

TABLE 9

| Cord | Adhesive Treatment | Belt Compound | Belt Running Temperature, (° C.) | # Cycles to Failure | Failure Mode | Comments |
|---|---|---|---|---|---|---|
| Carbon | Latex-based | CR | 125 | 52 | Belt shattered | Commercial CVT belt |
| Carbon | Latex-based | EPDM | 119 | 11 | Belt shattered | Prototype CVT belt |
| Carbon | Inventive | EPDM | 115 | 78 | Tooth cracks; cord intact in rubber body | Prototype CVT belt |

Another belt test was the Under-Drive Durability Test, which has test conditions modified to simulate continuous under-drive conditions at a speed ratio of 2.5 in CVT vehicles, and is more severe than the Fired Engine Test. This test may be used to predict potential performance of the treated cord and belt on a commercial CVT vehicle in the field, particularly under the roughest riding conditions, namely, rapid acceleration from rest or at low speeds. Results from the under-drive belt testing are shown in Table 10. Again, # of hours to failure is an average of at least 5 belts for each case. All belts were of similar size including thickness, width, profile angles, etc. Although the failure mode for all belts was similar ("shattered"), the inventive adhesive treated carbon cord belt exhibited a higher number of hours to failure than any of the comparative belts including two commercially used CVT belts.

Note that some other CVT belt tests were conducted which showed comparable performance to conventional latex treatments. These included axial stiffness, slip test, and the like, and are not described in detail because these types of tests were not expected to be greatly affected by the cord adhesive treatment.

TABLE 10

| Cord | Adhesive Treatment | Belt Compound | # of hours to failure | Failure Modes | Comments |
|---|---|---|---|---|---|
| Carbon | Inventive | EPDM | 68 | Shattered | Prototype belt |
| Carbon | Latex-based | CR | 11.7 | Shattered | Commercial belt |
| Carbon | Latex-based | EPDM | 4.3 | Shattered | Prototype belt |
| Aramid | Latex-based | EPDM | 48 | Shattered | Prototype belt |

TABLE 10-continued

| Cord | Adhesive Treatment | Belt Compound | # of hours to failure | Failure Modes | Comments |
|---|---|---|---|---|---|
| Aramid | Latex-based | CR | 9.4 | Shattered | Commercial belt |
| Aramid | Latex-based | CR | 10.3 | Shattered | Commercial belt |

Based on the impressive belt durability test results for the inventive adhesive treated carbon cord, performance evaluation was extended to Field Test conditions. Field Testing involved the inventive belts being tested on actual ATV/UTV vehicles, such as, Polaris and Can Am Maverick vehicles that are used for racing, recreational purposes, etc. "Field" here may include all off-road courses, desert terrains, race tracks, courses, and the like, where ATV/UTV vehicles may be used. Several of the EPDM/carbon belts of Table 10 were run on a Polaris vehicle in the field, and after two days of running the belt remained quite intact showing minimal belt wear, no cracks, and cord intact. On the other hand, the comparative belts with a conventional latex-based treatment on carbon cord did not perform well and experienced earlier failures at the cord line which may be attributed to weak cord adhesion.

The EPDM belts having the inventive adhesive treated carbon cord were Field Tested on a Can-Am Maverick vehicle. The drivers reported a 10% increase in horsepower and a 5 MPH gain in speed with these belts. In addition, the belts ran about 10° C. cooler and with less wear on the clutches than the stock belts ("stock" belts may refer to OEM belts). These performance attributes can be very beneficial, e.g., allowing racers to incur fewer belt failures during a race, and minimizing belt replacement costs as well as reducing maintenance costs on clutches.

Figure 5:
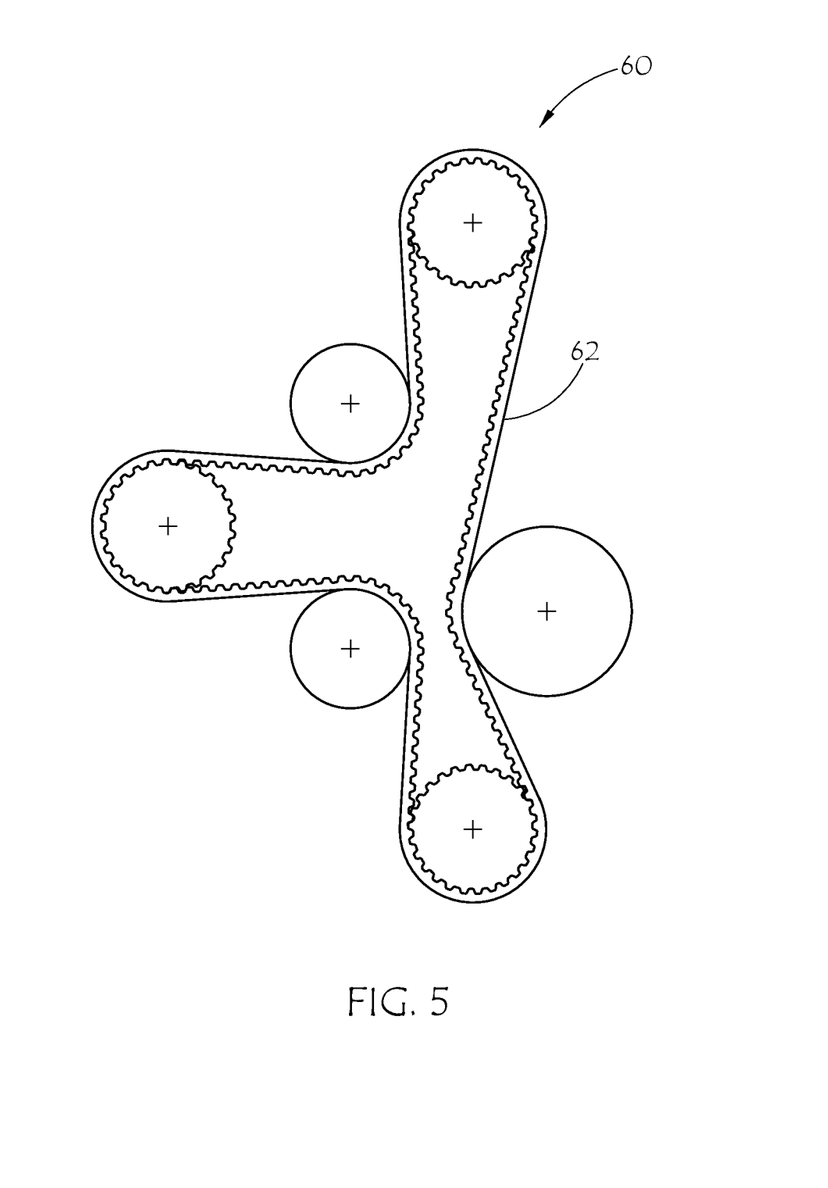
FIG. 5 is a schematic layout for a dynamic flex test of an automotive-type synchronous belt.

In other product testing, an otherwise conventional automotive synchronous belt construction with the inventive adhesive on carbon fiber tensile cords was compared to belts with conventional adhesives on fiberglass or carbon cord. The synchronous belts were made of HNBR rubber compound as the belt body. Static belt tests carried out including cord adhesion according to the previously described test illustrated in FIG. 2. The belts were also subjected to a cold crank dynamic flex test at −25° C., wherein the belt retained tensile strength was measured and used to rate performance. A belt heat build-up test was also performed on these belts. The layout 60 for the cold flex and heat buildup tests is illustrated in FIG. 5. Synchronous belt 62 is trained around three toothed pulleys with three backside idlers, one in each of the three spans. For the cold crank retained belt tensile test, belts are run at about 720 RPM for 10 cycles at a very low temperature (e.g. −25° C.)(where 1 minute on and 59 minutes off equals one cycle). For the heat build-up test, belts are run with no load at about 6200 RPM for the driver pulley for about 4 hours at ambient temperature and at an installation tension about 200 N.

Results of the static and dynamic flex tests of the synchronous belts are presented in Table 11. Test results show that the inventive adhesive treated carbon cord has comparable cord adhesion to conventional glass cord and to the comparative carbon cords with latex-based adhesives. However, the inventive cord treatment outperforms the others significantly in cold crank retained tensile strength, which is believed due to the low glass transition of the inventive adhesive composition.

TABLE 11

| Cord | Adhesive Treatment | Cord Adhesion, N | Cold Crank Retained Tensile, % | Belt Temperature, ° C. |
|---|---|---|---|---|
| Carbon | Inventive | 937 | 65 | 102 |
| Carbon | Latex-based | 1217 | 30 | 98 |
| Carbon | RFL | 1184 | 27 | 93 |
| Glass | Latex-based | 1005 | 55 | 93 |

In summary, the inventive adhesive composition for textile cords for elastomer composites provides good compatibility between carbon fibers or cords (as well as other fibers such as aramid) and elastomer matrices in reinforced dynamic rubber goods including power transmission belts of various kinds. The same benefits would also be realized in other reinforced composite articles, such as hoses, filament wound pressure vessels/tubes, and the like. The inventive adhesive gives significantly improved adhesion to various rubber compounds, such as EPDM and HNBR compared to conventional RFL and other latex-based systems. Inventive belts show significantly increased belt life over conventional or commercial belts of the same sizes and more than 10% improved retained cold crank tensile strength over conventional automotive synchronous belts.

Furthermore, lab testing for stability of the inventive adhesive composition indicated long shelf life (>6 months), i.e., much longer than RFL adhesives, with minimal change in formulation pH, viscosity, or percent solids (i.e., gel- and grit-free). The inventive formulation also requires fewer raw materials with shorter mix time than RFLs, for example, about 30 minutes versus 24 hours for most RFLs. Cord treatment using the inventive adhesive composition may be done in one step, that is, without need to pre-treat the cord material with a primer chemical or application of the overcoat material. These features could potentially offer significant cost savings in a cord treating process over use of traditional RFL adhesives.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. An elastomeric composition comprising an elastomer matrix and a fiber reinforcing said elastomer matrix; said fiber having been treated, followed by drying, with an aqueous adhesive composition comprising:

water as the solvent or dispersing medium;
a polyelectrolyte co-curable with the elastomer matrix;
a primer material compatible with the fiber and co-curable with the polyelectrolyte; and
a curative compatible with the polyelectrolyte and the elastomer matrix.

2. The elastomeric composition of claim 1 wherein said polyelectrolyte comprises a polymer backbone with pendant electrolyte groups comprising salts of organic acid groups.

3. The elastomeric composition of claim 2 wherein the polyelectrolyte comprises unsaturation in the polymer backbone or in side groups.

4. The elastomeric composition of claim 2 wherein the polymer backbone comprises a diene monomer.

5. The elastomeric composition of claim 2 wherein the polymer backbone comprises polybutadiene.

6. The elastomeric composition of claim 2 wherein the polyelectrolyte comprises at least partially neutralized, maleic-acid-grafted polybutadiene.

7. The elastomeric composition of claim 2 wherein the salts are sodium, potassium, ammonium, magnesium, calcium, aluminum, iron, copper, or zinc salts and the organic acid groups are carboxylic acid groups or sulfonic acid groups.

8. The elastomeric composition of claim 1 wherein the primer material is an epoxy resin or aqueous epoxy dispersion.

9. The elastomeric composition of claim 1, wherein the curative is an organic peroxide or a sulfur-based curative.

10. The elastomeric composition of claim 1 wherein the fiber is carbon fiber.

11. The elastomeric composition of claim 1 wherein the fiber is aramid fiber.

12. A power transmission belt comprising an elastomeric body comprising the elastomeric composition of claim 1.

13. A power transmission belt comprising: an elastomeric body, a reinforcing fiber embedded in said body, and an adhesive composition coating said fiber; the adhesive composition comprising the reaction product of:
a polyelectrolyte co-curable with a polymer matrix,
a primer material compatible with the fiber and co-curable with the polyelectrolyte, and
a curative compatible with the polyelectrolyte or with the polymer matrix.

14. The power transmission belt of claim 13 wherein said reinforcing fiber is carbon fiber.

15. The power transmission belt of claim 13 wherein the reinforcing fiber is aramid fiber.

16. The power transmission belt of claim 13 wherein the primer material is an epoxy resin or aqueous epoxy dispersion.

17. The power transmission belt of claim 13, wherein the curative is an organic peroxide or a sulfur-based curative.

18. The power transmission belt of claim 13 wherein said polyelectrolyte comprises a polymer backbone with pendant electrolyte groups comprising salts of organic acid groups.

19. The power transmission belt of claim 18 wherein the salts are sodium, potassium, ammonium, magnesium, calcium, aluminum, iron, copper, or zinc salts and the organic acid groups are carboxylic acid groups or sulfonic acid groups.

20. The power transmission belt of claim 18 wherein the polyelectrolyte comprises unsaturation in the polymer backbone or in side groups.

21. The power transmission belt of claim 18 wherein the polymer backbone comprises a diene monomer.

22. The power transmission belt of claim 18 wherein the polymer backbone comprises polybutadiene.

23. The power transmission belt of claim 18 wherein the polyelectrolyte comprises at least partially neutralized, maleic-acid-grafted polybutadiene.

* * * * *